US009030312B2

(12) United States Patent
Wittliff, III

(10) Patent No.: US 9,030,312 B2
(45) Date of Patent: May 12, 2015

(54) DIAGNOSTIC TOOL WITH GLOBAL POSITIONING SYSTEM AND ALERTS

(75) Inventor: William Wittliff, III, Gobles, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 659 days.

(21) Appl. No.: 13/156,494

(22) Filed: Jun. 9, 2011

(65) Prior Publication Data

US 2012/0313771 A1 Dec. 13, 2012

(51) Int. Cl.

| | |
|---|---|
| ***B60Q 1/00*** | (2006.01) |
| ***G07C 5/08*** | (2006.01) |
| *G07C 5/00* | (2006.01) |

(52) U.S. Cl.

CPC .............. *G07C 5/0808* (2013.01); *G07C 5/008* (2013.01); *G07C 5/085* (2013.01)

(58) Field of Classification Search

CPC .. H04W 4/02; G08G 1/096775; G08G 30/02; G06Q 30/0269
USPC ....................... 340/441, 438; 701/29, 213, 93
IPC ..... H04W 4/02; G08G 1/096775, 30/02; G06Q 30/0269

See application file for complete search history.

(56) References Cited

U.S. PATENT DOCUMENTS

| | | | | |
|---|---|---|---|---|
| 7,272,475 | B2 | 9/2007 | Gawlik et al. | |
| 7,979,178 | B2 | 7/2011 | Bertosa et al. | |
| 2008/0177438 | A1 | 7/2008 | Chen et al. | |
| 2008/0195271 | A1* | 8/2008 | Bertosa et al. | 701/29 |
| 2009/0276115 | A1 | 11/2009 | Chen | |
| 2010/0211284 | A1* | 8/2010 | Rothschild | 701/93 |
| 2011/0099036 | A1* | 4/2011 | Sarkissian et al. | 705/5 |

FOREIGN PATENT DOCUMENTS

| | | | |
|---|---|---|---|
| WO | 2010000262 | A1 | 1/2010 |

OTHER PUBLICATIONS

Extended Search Report for Application No. EP12169939 filed May 30, 2012.

* cited by examiner

*Primary Examiner* — Shirley Lu

(74) *Attorney, Agent, or Firm* — Baker & Hostetler LLP

(57) ABSTRACT

A diagnostic tool and method are provided wherein the diagnostic tool includes a global positioning system that alerts a user when a condition is exceeded. Examples of conditions include that the user is speeding during the test drive or has driven passed a defined area. The user can be alerted to such conditions. The owner of the shop may also locate the diagnostic tool by using a location server.

25 Claims, 4 Drawing Sheets

DIAGNOSTIC TOOL WITH GLOBAL POSITIONING SYSTEM AND ALERTS

FIELD OF THE INVENTION

The present invention relates generally to an automotive diagnostic tool. More particularly, the present invention relates to a diagnostic tool having a global positioning system (GPS) and associated alerts.

BACKGROUND OF THE INVENTION

Modern vehicles typically have one or more diagnostic systems, generally having separate computer control modules to control various functions of the vehicle. Some examples include a powertrain control module (PCM), an engine control module (ECM), a transmission control module (TCM), an anti-locking brake system (ABS), and an air bag control module. The vehicle diagnostic systems often have self-diagnostic capabilities to detect and alert the driver of problems that the vehicle may be encountering. When a problem is found, a diagnostic trouble code (DTC), is set within the computer's memory. DTCs are as general or as specific as the manufacturer desires.

To retrieve and decipher DTCs, an auto repair technician needs a diagnostic tool, such as a scan tool. The scan tool is connected to the vehicle's computer bus system via a data link connector (DLC) to access and retrieve the DTCs. Scan tools are testing devices that interface with vehicle diagnostic systems to retrieve information from the various control modules. Scan tools are equipped to communicate in various communication protocols such as Controller Area Network (CAN), J1850 VPM and PWM, ISO 9141, Keyword 2000 and others. These communication protocols may be specific to each of the various vehicle manufacturers. The scan tool will help the technician to diagnose and repair the vehicle based on the information the tool retrieves from the vehicle.

Further, the technician during testing may take the vehicle for a drive and may inadvertently speed or leave a defined testing area. Accordingly, it is desirable to provide alerts to the technician when certain events occur.

SUMMARY OF THE INVENTION

The foregoing needs are met, to a great extent, by the present invention, wherein in one aspect an apparatus is provided that in some embodiments allows a diagnostic tool having GPS to be configured to alert the user or the manager of the shop when certain events occur.

In accordance with one embodiment of the present invention a diagnostic tool for diagnosing a vehicle that includes a processor, a memory that stores a diagnostic software that communicates with the processor to perform a diagnostic function, a connector interface that connects the diagnostic tool to a data link connector in the vehicle, a signal translator that allows the diagnostic tool to communicate with the vehicle in at least one communication protocol, a global positioning system receiver coupled to the processor and provides a location of the diagnostic tool, and a wireless communication circuit that communicates with a remote computing device regarding the location of the diagnostic tool.

In accordance with another embodiment of the present invention, a method of operating a diagnostic tool for a vehicle includes connecting the diagnostic tool to the vehicle to conduct a diagnostic test, driving the vehicle to conduct the diagnostic test, communicating wirelessly with a remote computing device a location of the vehicle, and alerting a user of the diagnostic tool when a condition based on the location or a speed is exceeded.

In accordance with yet another embodiment of the present invention, a diagnostic tool for a vehicle, comprises a means for processing, a means for storing a diagnostic software that communicates with the means for processing to perform a diagnostic function, a means for connecting the diagnostic tool to a data link connector in the vehicle, a means for signal translating that allows the diagnostic tool to communicate with the vehicle in at least one communication protocol, a means for locating a location of the diagnostic tool, the means for locating coupled to the means for processing, and a means for communicating wirelessly with a remote computing device regarding the location of the diagnostic tool.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
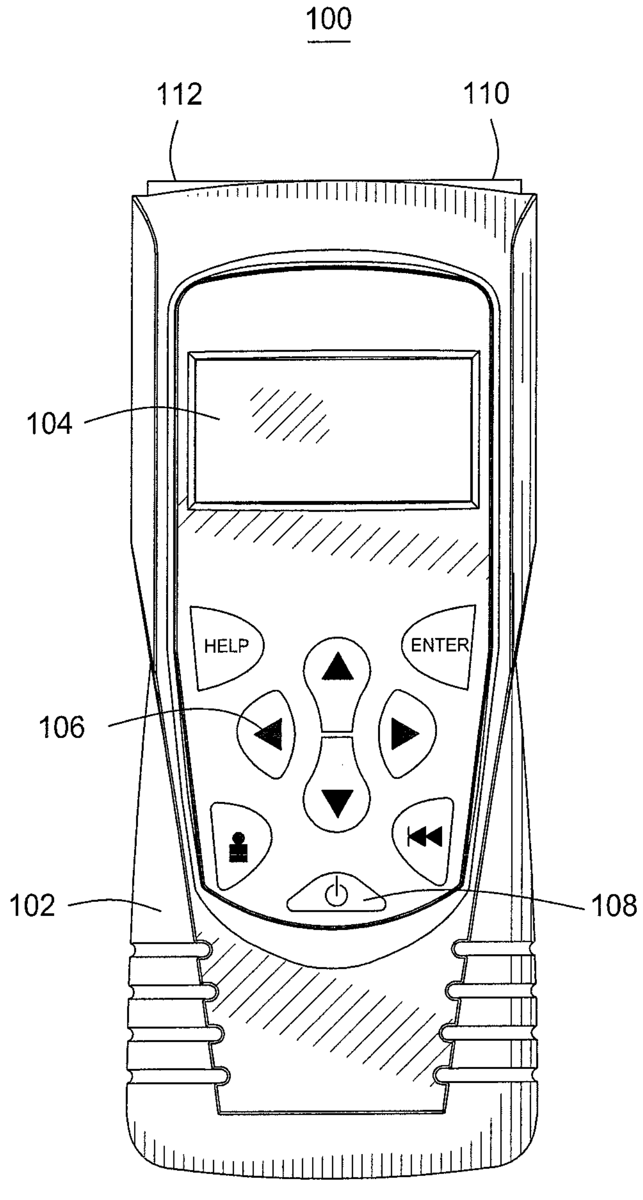
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus, such as a diagnostic tool with an integrated GPS and method that alerts the user or manager of certain events. The events can include speeding while diagnosing the vehicle or driving the vehicle outside a certain range. In another embodiment, a suggested test driving route may be provided to the user.

An embodiment of the present inventive apparatus is illustrated in FIG. 1. In particular, FIG. 1 is a front view illustrating a diagnostic tool 100 according to an embodiment of the invention. The diagnostic tool 100 can be any computing device, such as, for example, the Genisys® diagnostic tool from Service Solutions (a unit of the SPX Corporation) in Owatonna, Minn. or Elite Autoscanner® Pro CP9190 from Actron (a unit of Service Solutions). The diagnostic tool 100 includes a housing 102 to house the various components of the diagnostic tool, such as a display 104, a user interface 106, a power key 108, a memory card reader 110 (optional) and a connector interface 112. The display 104 can be any display, for example, a liquid crystal display (LCD), a video graphics array (VGA), a touch display (which can also be a user interface), etc. The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. The input device 106 can also be a mouse or any other suitable input device, including a keypad, or a scanner. The user interface 106 can also include numbers or be alphanumeric. The power key 108 allows the user to turn the diagnostic tool 100 on and off, as required.

Memory card reader 110 can be a single type card reader, such as a compact flash card, floppy disc, memory stick, secure digital memory, flash memory or other types of memory. The memory card reader 110 can be a reader that reads more than one of the aforementioned memory such as a combination memory card reader. Additionally, the memory card reader 110 can also read any other computer readable medium, such as CD, DVD, UMD, etc.

The connector interface 112 allows the diagnostic tool 100 to connect to an external device, such as an ECU of a vehicle (via a data link connector), a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
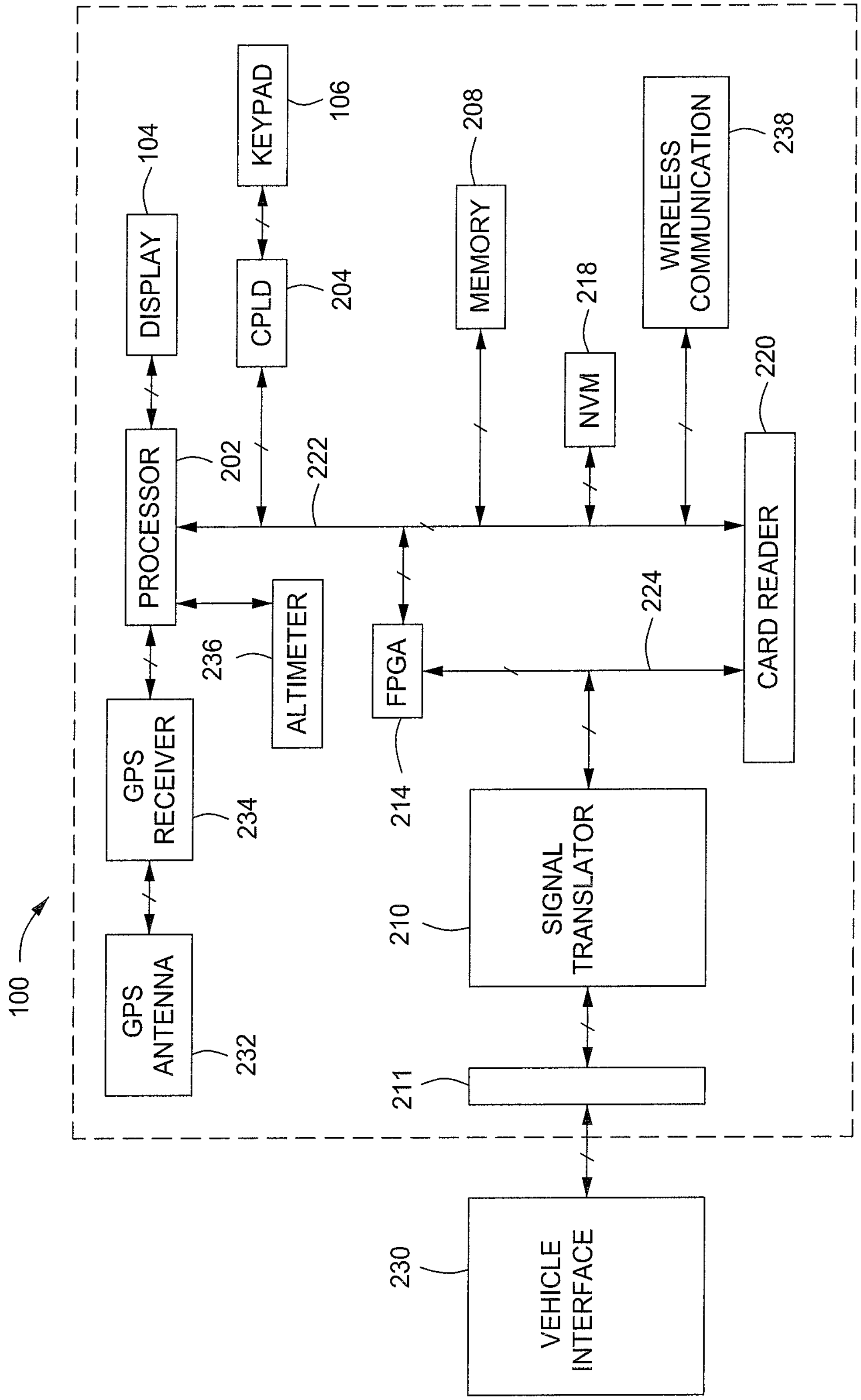
FIG. 2 is a block diagram of the components of a diagnostic tool according to an embodiment of the invention.

FIG. 2 is a block diagram of the components of the diagnostic tool 100 according to an embodiment of the invention. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory (NVM) 218, a card reader 220, a second system bus 222, a connector interface 211, a selectable signal translator 210, a GPS antenna 232, a GPS receiver 234, an optional altimeter 236 and wireless communication circuit 238. A vehicle communication interface 230 is in communication with the diagnostic tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database can include data for tuning or servicing (including diagnosing) a vehicle at various altitudes or regions. Because vehicles run differently (for example, oxygen levels vary at different altitudes) at different altitudes or regions, moving a vehicle (such as a racing vehicle) from one altitude to another or from one region (hot) to another region (cold) will require tuning the vehicle to that changed altitude and/or region as discussed below. The database can also be stored on an external memory, such as a compact flash card or other memories.

The database also includes a diagnostic database that can communicate with the GPS database, discussed below. By accessing the GPS database, the tool can map a test drive course for the technician to drive in order to diagnose the car.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The GPS antenna 232 and GPS receiver 234 may be mounted in or on the housing 102 or any combination thereof. The GPS antenna 232 electronically couples to the GPS receiver 234 and allows the GPS receiver to communicate (detects and decodes signals) with various satellites that orbit the Earth. The GPS receiver 234 electronically couples to the processor 202, which is coupled to memory 208, NVM 218 or a memory card in the card reader 220. The memory can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. The database may also store information such as speed limit, construction areas at various points on the map or contain information about a predefined area.

The GPS receiver must communicate with and "lock on" to a certain number of satellites in order to have a "fix" on its global location. Once the location is fixed, the GPS receiver with the help of the processor can determine the exact location including longitude, latitude, altitude, velocity of movement and other navigational data. The aforementioned information can be stored in the memory of the diagnostic tool for later retrieval. The GPS receiver can also receive current traffic information, location of stores including parts stores along the route. Further, since the diagnostic tool is used in the vehicle during testing, GPS information of the diagnostic tool can indirectly provide information about the vehicle.

Should GPS receiver be unable to lock onto the required number of satellites to determine the altitude or unable to determine the altitude for any reason, the altimeter 236 can be used to determine the altitude of the diagnostic tool 100. The altimeter 236 is electronically coupled to the processor 202 and can provide the altitude or elevation of the diagnostic tool. The altimeter can be coupled to a barometric pressure sensor (not shown) in order to calibrate the elevation measurements determined by the altimeter. The sensor can be positioned interior or exterior to the housing of the diagnostic tool. Minor atmospheric pressure changes can affect the accuracy of the altimeter, thus, diagnostic tool can correct for these changes by using the sensor in conjunction with the altimeter along with a correction factor.

Wireless communication circuit 238 communicates with the processor via second bus system 222. The wireless communication circuit can be configured to communicate to RF (radio frequency), satellites, cellular phones (analog or digital), Bluetooth®, Wi-Fi, Infrared, Zigby, Local Area Networks (LAN), WLAN (Wireless Local Area Network), or other wireless communication configurations and standards. The wireless communication circuit allows the diagnostic tool to communicate with other devices wirelessly. The wireless communication circuit includes an antenna built therein and being housed within the housing or can be externally located on the housing.

A scan tool program is needed to operate the scan tool to perform the various diagnostic tests. Different vehicle manufactures (or even within the same manufacture) require the scan tool to operate using different programs and communication protocols. The scan tool may determine whether it is operating the correct software or program for a particular vehicle by comparing the vehicle type with the program currently running on the scan tool. The vehicle type may be inputted into the scan tool through the user interface 106 in a manner such as, for example, scanning a bar coded VIN number located on the vehicle to be serviced. From the vehicle information, the scan tool can then determine whether it is presently running the necessary program to service the vehicle.

Figure 3:
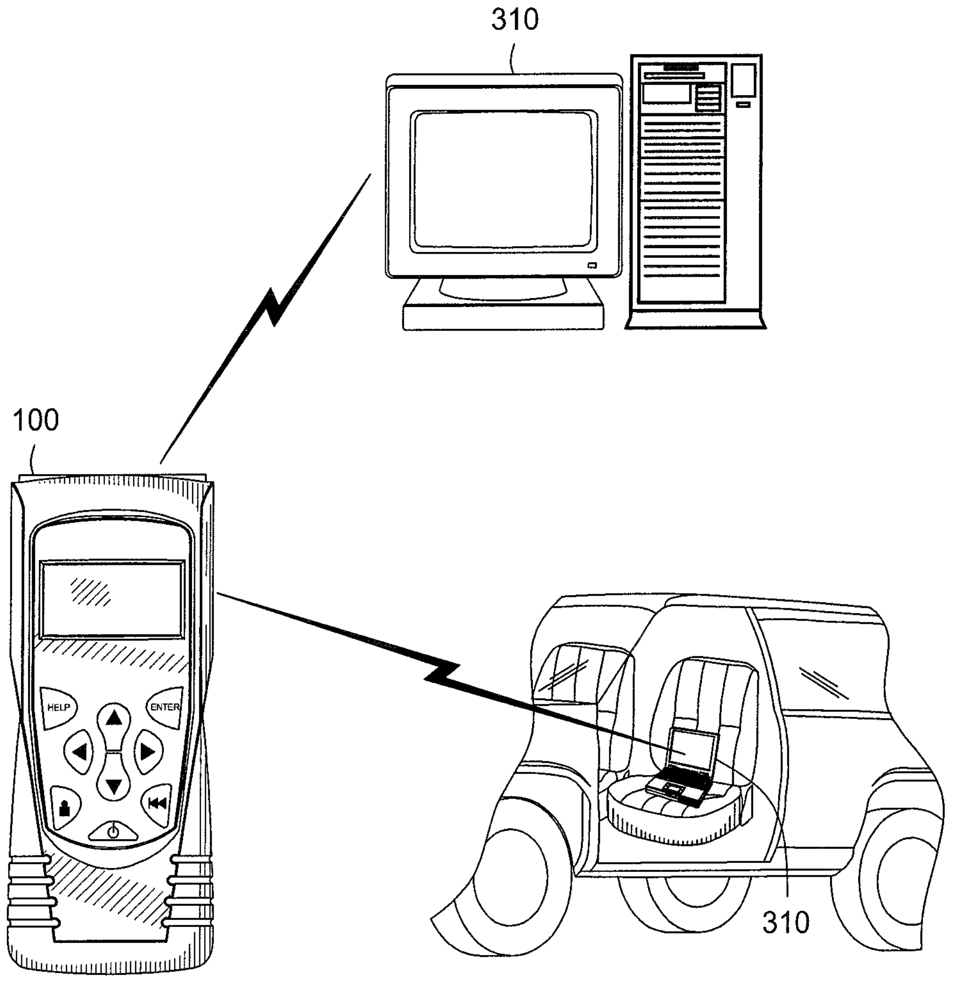
FIG. 3 illustrates a diagnostic tool wirelessly communicating with a remote computer.

FIG. 3 illustrates the diagnostic tool wirelessly communicating with a remote computer. The diagnostic tool 100 communicates with the remote computing device 310 (location server). In one embodiment, the diagnostic tool can be used in and around a service station, while communicating with a remote computing device located inside the service station to obtain the proper diagnostic tool program. In another embodiment, the diagnostic tool can be used to communicate with a remote computer by wirelessly accessing the internet to obtain the proper diagnostic tool program.

In still another embodiment, the diagnostic tool can be used in and around a tow-truck or other service vehicle that is responding to a call away from the service station. In this embodiment, the diagnostic tool would communicate with a remote computing device located inside or near the tow-truck or other service vehicle to obtain the proper diagnostic software.

Figure 4A:
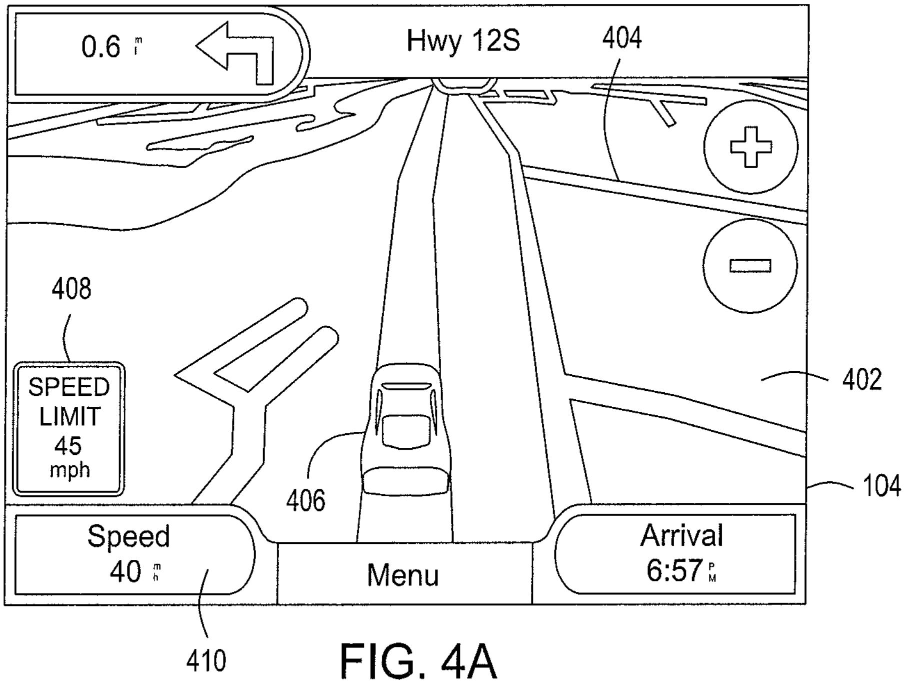
FIGS. 4A-B illustrate examples of GPS screens according to embodiments of the invention.

Often times, in order to duplicate problems with the vehicle, the user or technician must take the vehicle for a test drive. As the user is driving and looking at the diagnostic tool, he may not be aware of the speed of the vehicle or the speed limit at the location where he is driving. As shown in FIG. 4A, the diagnostic tool can be programmed to provide the user with information during the test drive such as the speed at which the vehicle is travelling (via the information received by the GPS) and the speed limit at the location of the test drive. FIG. 4A includes screen 402 that can be positioned on the entire display 104 of the diagnostic tool 100 or can be positioned on a portion of the display. Screen 402 shows a road map 404 that includes a position 406 of the vehicle under test. Also shown on screen 402 is a speed limit sign 408 for the location of the vehicle and a current speed indicator 410. The speed indicator 410 and the speed limit sign 408 may be displayed on the diagnostic tool all the time or flash on the display for a period of time and then disappear or "ghost out."

The diagnostic tool can compare the speed limit sign 408 information and the speed indicator 410 information and alert the user/driver that he is speeding or driving too slow. In one embodiment, the alert may be visual such as the speed indicator flashing or changing colors of the speed indicator 410 and/or the speed limit sign 408. In another embodiment, the alert may be through sound, such as beeping or change from one decibel to another (higher or lower or alternating). In still another embodiment, the alert may be through vibration of the diagnostic tool or any combination of visual, sound or vibration.

Figure 4B:
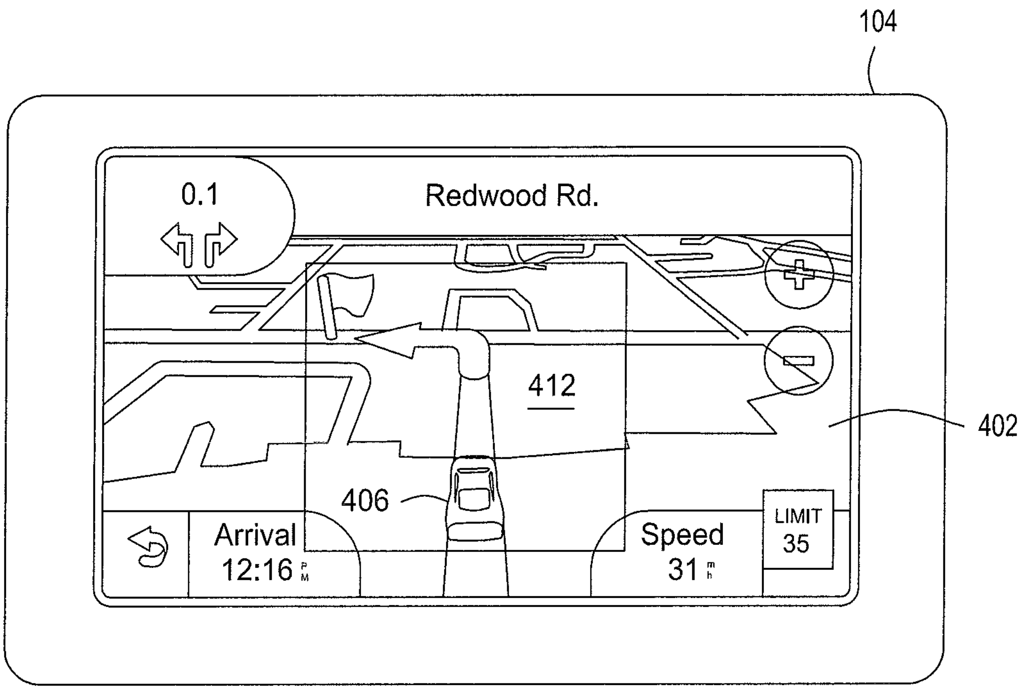

In another embodiment of the invention, the diagnostic tool 100 can be programmed to alert the user that he has travelled beyond a previously defined area. FIG. 4B illustrates the screen 402 that includes the road map 404 with the location of the vehicle 406 and the defined area 412. The defined area 412 can be any area desired by the user including the shop owner. In this embodiment, the user may want to be alerted if he has travelled outside of the defined area. The user may want to know that he is outside the defined area which can be the distance in which he needs to drive to diagnose the vehicle or that the distance that vehicle will display the symptoms complained by the owner of the vehicle. In another embodiment, the shop owner may not want the technician to travel too far (beyond the defined area) so an alert will commence. Alternatively, the shop owner may rent or loan the diagnostic tool to the user and simply wants the user to know that he has travelled with the diagnostic tool beyond the defined area and must return to the shop or return to a point within the defined area. The defined area may be agreed on by the user and the shop owner or previously defined by the user or shop owner.

Once the diagnostic tool 100 (or indirectly the vehicle) has travelled beyond the defined area 412 then the diagnostic tool can alert the user by flashing the screen 402, can vibrate the diagnostic tool or can generate a sound or any combination thereof. In another embodiment, the diagnostic tool can alert the shop or shop owner that the diagnostic tool has travelled beyond the defined area 412. The alert may be a wireless signal to a computing device or messaging device designated by the owner. The signal may be a fax, an email, a text or similar messaging formats.

In still another embodiment, the shop owner can also locate the diagnostic tool 100 by requesting the diagnostic tool its location. The diagnostic tool can send its location via the wireless communication 238 to a location server (310) located in the shop or a location designated by the diagnostic tool manufacturer. The location can be sent on an intermittent basis or in real time to the server. The shop owner or user can register the diagnostic tool 100 with the location server 310 so that the diagnostic tool can be located when desired. Each diagnostic tool 100 is assigned identification information, such as a device identification number that is used to register the diagnostic tool 100 with the location server 310. The location can be used to locate lost diagnostic tool or to ascertain how many diagnostic tool are operating or working in the shop or defined area 412. By knowing the number of diagnostic tools that are working, the shop can efficiently assign work or schedule the work based on the number of diagnostic tool in the defined area 412.

In still another embodiment, the user may want to know all of the location in which he has driven the vehicle. The diagnostic tool may be programmed to track and store in the memory all of the places the user has driven to during the test drive. This way he knows that he has driven to all the areas that he needs to in order to properly diagnose the vehicle. Areas that he may want to drive to could be higher or lower elevation areas so that he can repeat the problem experienced by the owner for a particular elevation. In another embodiment, the information of the places that the user has driven during the test drive can be used as evidence that the user did not travel to unauthorized places with the owner's vehicle such as to the user's home or grocery store or can be used to show the unauthorized places in which the user had travelled to during his test drive.

In another embodiment, the information such as speed, acceleration or de-acceleration of the vehicle by the user can be stored in the diagnostic tool. This allows the shop owner to detect any abuse of the owner's (customer's) vehicle by the user. This may happen when an over zealous user takes a vehicle for an after repair test drive but because the vehicle is an expensive high performance vehicle, the user may quickly accelerate or de-accelerate the vehicle to achieve an adrenaline rush, for example.

In still another embodiment, after retrieving diagnostic data from the vehicle, the tool may access its diagnostic database and the GPS database to map a test drive for the user in order to confirm the diagnosis or to conduct additional test that may be needed. The GPS will provide a route that the technician can drive. Further, the tool may provide instructions on the screen to the technician to follow, such as deceleration, acceleration, idling or braking at various points in the drive. This allows the tool to confirm the diagnosis or collect additional data in order to properly diagnose the symptoms of the vehicle.

The various embodiments herein can be implemented and configured on the diagnostic tool by the shop owner. The diagnostic tool may have security features such as password protection or biometric (such as fingerprint) detection so that only the shop owner can change the configuration. The user and/or the shop owner can configure the diagnostic tool various alerts functionality that best suits their needs.

Although a vehicle diagnostic tool has been described herein, the embodiments herein may be used with other types of diagnostic tools including vehicle connector interface (VCI). The VCI may not include a screen or a user input. However, the various alerts, for example, may still be implemented and the user input may be coupled to the VCI or the VCI may be coupled to a computing device so that the VCI may be programmed via the computing device's user interface.

With the various embodiments described herein, various benefits are bestowed on the user/technician, the vehicle owner and/or the shop owner. By implementing these safety features, the user may be kept safe and the customer satisfied with the service. Further, the various embodiments can help enhance the reputation and integrity of the repair shop or dealership.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:
a processor;
a memory that stores diagnostic software that communicates with the processor to perform a diagnostic function;
a connector interface that connects the diagnostic tool to a data link connector in the vehicle;
a signal translator that allows the diagnostic tool to communicate with the vehicle in at least one communication protocol;
a global positioning system receiver coupled to the processor and provides a location of the diagnostic tool; and
a wireless communication circuit that communicates with a remote computing device regarding the location of the diagnostic tool, wherein the processor alerts a user when a predefined event occurs, wherein the processor displays on a display of the diagnostic tool a test drive route to a user in order to confirm a diagnosis, and wherein instructions on how to drive the vehicle are provided to the user to follow on the test drive route.

2. The diagnostic tool of claim 1, wherein the remote computing device is a location server.

3. The diagnostic tool of claim 1 further comprising an altimeter coupled to the processor, wherein the altimeter provides altitude information of the diagnostic tool.

4. The diagnostic code of claim 2, wherein the diagnostic tool includes an identification number that is used to register the diagnostic tool with the location server.

5. The diagnostic code of claim 1, wherein the diagnostic tool includes an identification number that is used to register the diagnostic tool with a location server.

6. The diagnostic tool of claim 2, wherein the location of the diagnostic tool is discoverable by the user accessing the location server.

7. The diagnostic tool of claim 1, wherein the diagnostic tool displays on the display a speed limit of a location of the vehicle and a speed of the vehicle based on data from the global position system receiver.

8. The diagnostic tool of claim 7, wherein the diagnostic tool alerts the user that the speed of the vehicle exceeds the speed limit of the location determined by the global position system receiver.

9. The diagnostic tool of claim 1, wherein the diagnostic tool alerts the user that he has travelled beyond a defined area based on the location of the diagnostic tool determined by the global position system receiver.

10. The diagnostic tool of claim 1, wherein diagnostic tool provides locations of a test drive by the user determined by the global position system receiver.

11. The diagnostic tool of claim 1, wherein the predefined event is the vehicle travelling faster than a speed limit or travelling beyond an area based on a location determined by the global position system receiver.

12. A method of operating a diagnostic tool for a vehicle, comprising:

connecting the diagnostic tool to the vehicle to conduct a diagnostic test;

providing a route on a display of the diagnostic tool for a user to follow to conduct the diagnostic test and confirm diagnosis;

driving the vehicle via the route to conduct the diagnostic test;

communicating wirelessly with a remote computing device a location of the vehicle; and alerting the user of the diagnostic tool when a condition based on the location or a speed is exceeded.

13. The method of claim 12, wherein the condition is the vehicle exceeding a speed limit for the location of the diagnostic tool.

14. The method of claim 12, wherein the condition is the diagnostic tool's location is not in a defined area.

15. The method of claim 12, wherein the alert is a flashing of at least a portion of the display on the diagnostic tool.

16. A diagnostic tool for diagnosing a vehicle, comprising:

means for processing;

means for storing a diagnostic software that communicates with the means for processing to perform a diagnostic function;

means for connecting the diagnostic tool to a data link connector in the vehicle;

means for signal translating that allows the diagnostic tool to communicate with the vehicle in at least one communication protocol;

means for locating a location of the diagnostic tool, the means for locating coupled to the means for processing; and means for communicating wirelessly with a remote computing device regarding the location of the diagnostic tool, wherein the means for processing alerts a user when a predefined event occurs, wherein the means for processing displays on a display of the diagnostic tool a test drive route to the user in order to confirm a diagnosis, and wherein instructions on how to drive the vehicle are provided to the user to follow on the test drive route.

17. The diagnostic tool of claim 16, wherein the remote computing device is a location server.

18. The diagnostic tool of claim 16 further comprising an altimeter coupled to the means for processing, wherein the altimeter provides altitude information of the diagnostic tool.

19. The diagnostic code of claim 17, wherein the diagnostic tool includes an identification number that is used to register the diagnostic tool with the location server.

20. The diagnostic code of claim 16, wherein the diagnostic tool includes an identification number that is used to register the diagnostic tool with a location server.

21. The diagnostic tool of claim 17, wherein the location of the diagnostic tool is discoverable by the user accessing the location server.

22. The diagnostic tool of claim 16, wherein the diagnostic tool displays on the display a speed limit of the location of the vehicle and a speed of the vehicle based on data from means for locating.

23. The diagnostic tool of claim 22, wherein the diagnostic tool alerts the user that the speed of the vehicle exceeds the speed limit of the location of the diagnostic tool.

24. The diagnostic tool of claim 16, wherein the diagnostic tool alerts the user that he has travelled beyond a defined area based on the location of the diagnostic tool.

25. The diagnostic tool of claim 16, wherein diagnostic tool provides locations of a test drive by the user.

* * * * *